US011003713B1

(12) United States Patent
Nagaraja et al.

(10) Patent No.: US 11,003,713 B1
(45) Date of Patent: May 11, 2021

(54) AUTOMATED UPDATING OF VIDEO CONTENT

(71) Applicant: SAP SE, Walldorf (DE)

(72) Inventors: Pavan Kowshik Santebidanur Nagaraja, Bangalore (IN); Tapan Prakash T, Kannur/Kerala/South (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/693,781

(22) Filed: Nov. 25, 2019

(51) Int. Cl.
*G06F 17/10* (2006.01)
*G06F 16/74* (2019.01)
*G06F 16/908* (2019.01)
*G06F 16/9032* (2019.01)
*G06F 16/904* (2019.01)
*G06F 16/9038* (2019.01)
*G06F 16/901* (2019.01)

(52) U.S. Cl.
CPC .......... *G06F 16/748* (2019.01); *G06F 16/901* (2019.01); *G06F 16/904* (2019.01); *G06F 16/908* (2019.01); *G06F 16/9038* (2019.01); *G06F 16/90332* (2019.01)

(58) Field of Classification Search
CPC .. G06F 16/748; G06F 16/901; G06F 16/9038; G06F 16/904; G06F 16/90332; G06F 16/908
See application file for complete search history.

(56) References Cited

U.S. PATENT DOCUMENTS

| 5,996,015 A | * | 11/1999 | Day | H04L 29/06 348/E7.071 |
| 6,195,692 B1 | * | 2/2001 | Hsu | H04N 7/17318 725/110 |
| 6,330,595 B1 | * | 12/2001 | Ullman | G11B 27/322 709/219 |
| 7,139,813 B1 | * | 11/2006 | Wallenius | H04N 21/2225 709/219 |
| 8,479,246 B2 | * | 7/2013 | Hudson | H04N 21/435 725/113 |
| 9,578,351 B1 | * | 2/2017 | Bynoe | H04N 21/4312 |
| 9,838,740 B1 | * | 12/2017 | Gilbert | H04N 21/8405 |
| 9,930,415 B2 | * | 3/2018 | Gregov | H04N 21/25891 |
| 10,715,860 B1 | * | 7/2020 | Bartlett | A63F 13/35 |
| 10,783,214 B1 | * | 9/2020 | Rowe | G06F 16/9577 |
| 2008/0060034 A1 | * | 3/2008 | Egnal | G03B 37/04 725/105 |
| 2010/0293190 A1 | * | 11/2010 | Kaiser | H04N 21/4312 707/769 |
| 2010/0325657 A1 | * | 12/2010 | Sellers | H04N 21/2387 725/32 |

(Continued)

OTHER PUBLICATIONS

U.S. Appl. No. 16/050,885, filed Jul. 31, 2018, Nagaraja et al.

*Primary Examiner* — Shahid K Khan
(74) *Attorney, Agent, or Firm* — Fish & Richardson P.C.

(57) ABSTRACT

Methods, systems, and computer-readable storage media for receiving metadata indicating one or more data sources, automatically retrieving data from a data source indicated in the metadata based on analytical data, generating a visualization based on the data, the visualization including an updated version of a previous visualization, generating an image of the visualization, and providing a video including the image, the image replacing a previous image within the video.

20 Claims, 7 Drawing Sheets

(56) References Cited

U.S. PATENT DOCUMENTS

2016/0092602 A1\* 3/2016 Liu .................... G06F 16/2428
  715/738
2018/0165283 A1  6/2018 Rana et al.
2020/0329285 A1\* 10/2020 Edwards ............ H04N 21/8586

\* cited by examiner

AUTOMATED UPDATING OF VIDEO CONTENT

BACKGROUND

Video is a compelling medium for communication. For example, advertisements often use video to engage consumers more effectively than other types of media (e.g., print, radio). Videos often include content that is used to provide information, which enables viewers to make decisions. For example, videos can be used in presentations to effectively engage an audience and inform the audience on particular topics. However, videos are static in nature. Once a video is created, the video must be again edited to change content. Video editing is not a skill that everyone has by default and can be difficult to effectively perform. Even for users with video editing skills, editing videos can be time consuming and cumbersome, particularly for relatively dynamic content.

SUMMARY

Implementations of the present disclosure are directed to automated updating of video content. More particularly, implementations of the present disclosure are directed to a video editing platform that automatically updates content in videos to provide a dynamic video that changes as content changes.

In some implementations, actions include receiving metadata indicating one or more data sources, automatically retrieving data from a data source indicated in the metadata based on analytical data, generating a visualization based on the data, the visualization including an updated version of a previous visualization, generating an image of the visualization, and providing a video including the image, the image replacing a previous image within the video. Other implementations of this aspect include corresponding systems, apparatus, and computer programs, configured to perform the actions of the methods, encoded on computer storage devices.

These and other implementations can each optionally include one or more of the following features: the video is generated based on a set of images including one or more static images and one or more dynamic images, the image including a dynamic image; the visualization is generated as a hypertext markup language (HTML) content division element (<div>); the image is generated as a screenshot of the visualization; the analytical data includes at least one measure and at least one dimension; the data source includes one of a database and a data file; and retrieving the data includes querying the data source using a query and receiving the data responsive to the query.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
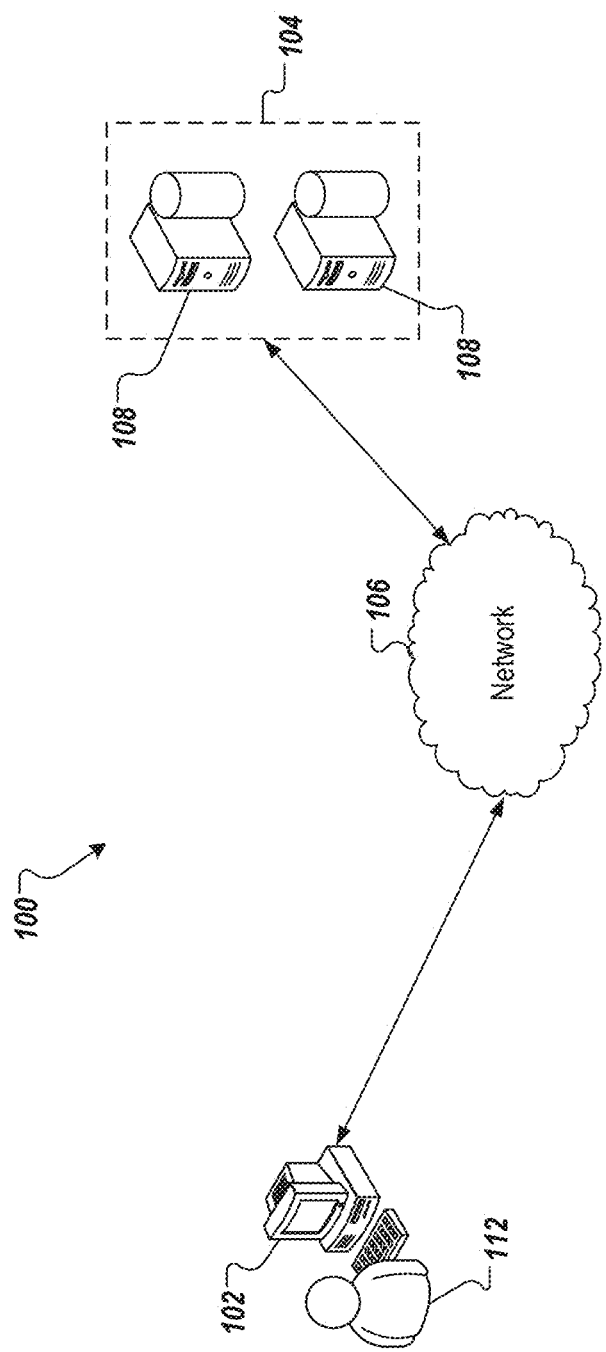
FIG. 1 depicts an example architecture that can be used to execute implementations of the present disclosure.

Implementations of the present disclosure are directed to automated updating of video content. More particularly, implementations of the present disclosure are directed to a video editing platform that automatically updates content in videos to provide a dynamic video that changes as content changes. Implementations can include actions of receiving metadata indicating one or more data sources, automatically retrieving data from a data source indicated in the metadata based on analytical data, generating a visualization based on the data, the visualization including an updated version of a previous visualization, generating an image of the visualization, and providing a video including the image, the image replacing a previous image within the video.

To provide further context for implementations of the present disclosure, and as introduced above, video is a compelling medium for communication. For example, advertisements often use video to engage consumers more effectively than other types of media (e.g., print, radio). Videos often include content that is used to provide information, which enables viewers to make decisions. For example, videos can be used in presentations to effectively engage an audience and inform the audience on particular topics. However, videos are static in nature which means, once a video is created, the video must be again edited to change content. Video editing is not a skill, which everyone has by default, and can be difficult to effectively perform. Even for users with video editing skills, editing videos can be time consuming and cumbersome, particularly for relatively dynamic content (e.g., content that changes hourly, daily, weekly).

In an example use case, and without limitation, videos can be used to convey information regarding operations of an enterprise (e.g., sales figures, revenue figures), which information enables users to make decisions on enterprise operations. For example, videos can include embedded visualizations (e.g., in the form of charts, graphs, and the like) that graphically depict information (content) relevant to an audience. In many cases, the information is dynamic, changing over time (e.g., hourly, daily, weekly, quarterly, yearly). For example, an example video can include visualizations based on the revenue of an enterprise, which revenue changes daily. In some examples, user interfaces (UIs) can include embedded videos that convey information to users on-demand. For example, a UI can include a periodic feed (e.g., daily feed) that conveys information to users using at least one embedded video. In some examples, the information that is to-be-conveyed in the video can change between a first time a user views the UI and a second time the user views the UI.

In view of the above context, implementations of the present disclosure provide a video editing platform that automatically updates content in videos to provide dynamic videos that change as content changes. More particularly, and as described in further detail herein, the video editing platform includes a video composer application that dynamically embeds content (e.g., analytical content) into a video. In some implementations, the video composer application automatically creates dynamic videos by fetching the content from a data source and updating the video based on the content, the content changing over time. In this manner, the video editing platform of the present disclosure enables a video to be composed once, but effectively be played "live" as content changes over time.

Implementations of the present disclosure are described in further detail with reference to an example use case that includes videos that convey information representative of enterprise operations. It is contemplated, however, that implementations of the present disclosure can be realized in any appropriate use case.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, and as described in further detail herein, content that changes within a video can be provided based on data stored within a data source. In some examples, the data source can be hosted by the server system 104. Example data sources can include, without limitation, a data file (e.g., a comma-separated values (CSV) file) and a database (e.g., an in-memory database). In some examples, data is stored in a data object, which can be provided as a data cube (e.g., an online analytical processing (OLAP) data cube). In some examples, a data cube is provided as an array of data categorized into one or more dimensions. For example, a data cube can be a representation of a multi-dimensional spreadsheet (e.g., a multi-dimensional dataset including a plurality of data tables). In some examples, a data cube includes a plurality of cells, where cells are populated with respective values (e.g., number, text). In some examples, each value represents some measure (e.g., sales, revenue, profits, expenses, budget, forecast).

In some implementations, a data cube can enable manipulation and/or analysis of data stored in the data cube from multiple perspectives (e.g., by dimensions, measures, and/or elements of the data cube). In some examples, a dimension of a data cube defines a category of stored data. Example dimensions can include, without limitation, time, location, product. In some examples, each dimension can have one or more sub-dimensions. For example, the time dimension can include sub-dimensions of year, each sub-dimension of year can include sub-dimensions of quarter, each sub-dimension of quarter can include sub-dimensions of month, each sub-dimension of month can include sub-dimensions of week, and so on. As another example, the product dimension can include sub-dimensions of category, and each sub-dimension of category can include sub-dimensions of line. As another example, the location dimension can include sub-dimensions of country, each sub-dimension of country can include sub-dimensions of region (e.g., north, east, west, south, mid-west), each sub-dimension of region can include sub-dimensions of sub-region (e.g., state, province), and each sub-dimension of sub-region can include sub-dimensions of city. In some examples, a data cube can include three-dimensions. In some examples, a data cube having more than three-dimensions is referred to as a hypercube.

As noted above, data stored in the data object includes one or more measures. In some examples, each measure is a fact (e.g., a numerical fact, a textual fact). In some examples, each measure can be categorized into one or more dimensions. Example measures can include specific product sales data (e.g., quantity sold, revenue, and/or profit margin), categorized by dimension. In short, measures can include any appropriate data that may be manipulated according to logic to assist or support the enterprise.

In accordance with implementations of the present disclosure, and as noted above, the server system 104 can host a video editing platform that automatically updates content in videos to provide dynamic videos that change as content changes. In some implementations, the video editing platform includes a video composer application that dynamically embeds content (e.g., analytical content) into a video. In some implementations, the video composer application automatically creates dynamic videos by fetching the content from a data source and updating the video based on the content, the content changing over time. In this manner, the video editing platform of the present disclosure enables a video to be composed once, but effectively be played "live" as content changes over time. In some examples, the video is displayed to the user 112 within the client device 102. For example, the video can be displayed within a web browser executed by the client device 102.

Figure 2:
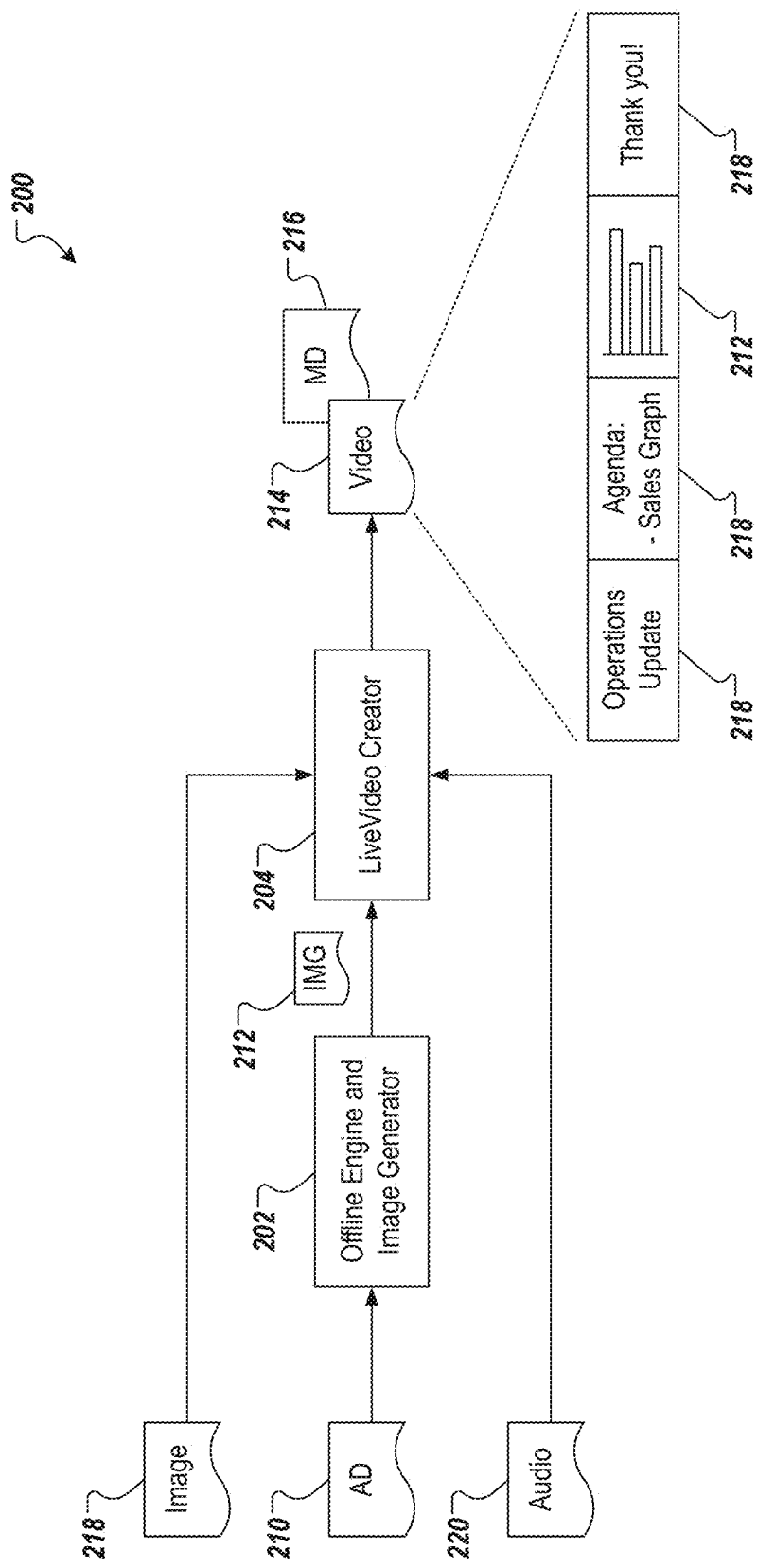
FIG. 2 depicts an example video creation workflow in accordance with implementations of the present disclosure.

FIG. 2 depicts an example video creation workflow 200 in accordance with implementations of the present disclosure. In the example of FIG. 2, the video creation workflow 200 is at least partially executed by an offline engine and image generator 202 and a LiveVideo creator 204, collectively making up at least a portion of the video editing platform of the present disclosure. More particularly, and as described in further detail herein, the offline engine and image generator 202 processes analytical data (AD) 210 to provide a visualization image file 212 to the LiveVideo creator 204 (e.g., the video composer application). The visualization image file 212 depicts a visualization (e.g., a graphic, such as a chart) based on data retrieved from a data source, as described in further detail herein. In some examples, the LiveVideo creator 204 processes the visualization image file 212 to provide a video 214 and metadata (MD) 216. In some examples, the LiveVideo creator 204 receives an image file 218 and processes the image file 218 in hand with the visualization image file 212 to provide the video 214 and the metadata 216. In some examples, the LiveVideo creator 204 receives an audio file 220 and processes the audio file 220 in hand with the image file 212 (and the image file 218, if provided) to provide the video 214 and the metadata 216. Although a single visualization image file 212, a single image file 218, and a single audio file 220 are depicted, it is contemplated that implementations of the present disclosure can be realized using any appropriate number of files (e.g., no audio file 220).

In some implementations, it can be specified when and for how long a particular input is to be present within the video 214 that is to be created by the LiveVideo creator 204. For example, for each of the visualization image file 212 and the image file 218, it can be specified when and for how long the respective image file 212, 218 is to be displayed within the video 214. As another example, for the audio file 220, it can be specified when the audio file 220 is to be played during the video 214.

In accordance with implementations of the present disclosure, the analytical data 210 is provided from a so-called analytical smart tile (AST), which stores analytical content. In some implementations, the AST provides the analytical data 210 to the offline engine and image generator 202. The AST can be provided as a data structure that contains user input defining content that is used to provide a visualization to be displayed in the video 214, as described in further detail herein. In some examples, the analytical data 210 indicates one or more measures and one or more dimensions for determining a set of data that is to be used to generate content displayed in the visualization image file 212. In some examples, the analytical data 210 includes one or more filters that are to be applied to generate the visualization displayed in the visualization image file 212. For example, and as described in further detail herein, the analytical data 210 defines what data is to be retrieved from the data source as content that is to be displayed in the video 220 (e.g., sales revenue per each city in a set of cities over a particular period of time). In the example use case, example analytical data 210 can include:

| | |
|---|---|
| Data Source: | operationsdata.csv |
| Visualization Type: | Bar Chart |
| Dimensions: | City |
| Measures: | Sales Revenue |
| Duration: | 5 |
| Filter Dimension: | City |
| Filter Values: | Bangalore, Chennai, Mumbai |

In accordance with implementations of the present disclosure, the video editing platform provides a UI (e.g., displayed on the client device 102), through which a user can create a video. In some examples, the UI enables the user to select media to be used in creating the video. Example media includes, without limitation, images, video, audio, and dynamic visualizations. For example, the user can begin the video creation process by selecting a UI element to create a video. In response, a video editing UI is displayed, which enables the user to select media to be included in the video.

In a non-limiting example, the video editing UI enables the user to select images, dynamic visualizations, and audio. For example, in response to user selection of images, an add image UI is displayed, through which the user is able to select an image file that is to be displayed in the video and to define a duration (e.g., in seconds) that the image is to be displayed. For example, the add image UI enables the user to select an image file from a local drive, a network drive, and/or the Internet. After the user has selected the image file and the duration, the video editing UI is again displayed and depicts the image represented in the image file (e.g., as a thumbnail image).

In response to user selection of dynamic visualizations, an AST UI is displayed, through which the user can define a dynamic visualization that is to be displayed in the video and to define a duration (e.g., in seconds) that the dynamic visualization is to be displayed. In some examples, the AST UI includes UI elements to select analytical data including a data source, a visualization type, one or more dimensions, one or more measures, and the duration. The AST UI also enables one or more filters to be selected (e.g., filter based on dimension). In some examples, and as described herein, the data source stores the data that is to be used to update the dynamic visualization when the resulting video is played. Example visualization types include, without limitation, column chart, bar chart, line chart, pie chart, and table. After the user has defined the visualization and the duration, an image file representing a visualization image depicting the visualization is provided, as described in further detail herein. The video editing UI is again displayed and depicts the visualization image represented in the image file (e.g., as a thumbnail image).

Referring again to FIG. 2, the video 214 is provided as a sequence of media including images 218 and the visualization image 212. The images 218 are static images that do not change between plays of the video 214. The visualization image 212 is a dynamic image that can change between plays of the video 214. That is, the visualization depicted in the visualization image 212 changes, if the data underlying the visualization changes between plays of the video 214. The metadata 216 includes a reference to and location of the data source that the visualization depicted in the visualization image 212 is based on. As described in further detail herein, each time that the video 214 is played, data is retrieved from the data source based on the metadata 216, the visualization is generated based on the data, and the visualization image 214 is recreated and provided in the video 214. In this manner, changes to the data within the data source are represented in the visualization each time that the video 214 is played.

In accordance with implementations of the present disclosure, the metadata 216 provides information for generation of the video 214. In some examples, the metadata 216 indicates the data source, from which data is to be retrieved (e.g., one or more data sources indicated by the user, when originally creating the video 214). In some examples, the metadata 216 indicates media, order of media, and duration of each medium provided in the video 214. In some examples, the metadata 216 indicates analytical data that is used to query each of the one or more data sources indicated in the metadata 216. In some implementations, and as described in further detail herein, the metadata 216 can be used to automatically regenerate the video 214 (e.g., as a video 214') to include an updated visualization, in response to a request to play the video 214.

Figure 3:
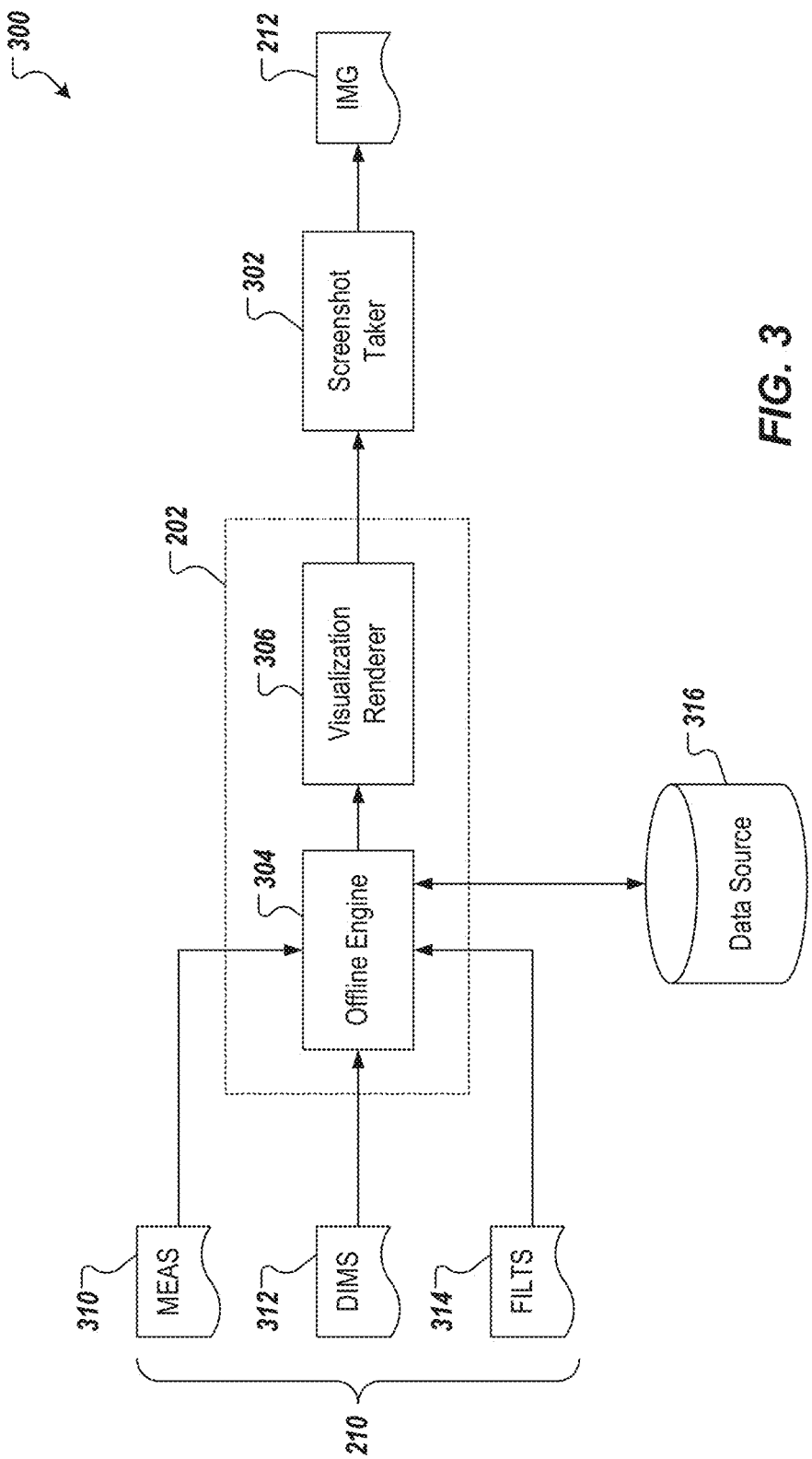
FIG. 3 depicts an example image generation workflow in accordance with implementations of the present disclosure.

FIG. 3 depicts an example image generation workflow 300 in accordance with implementations of the present disclosure. The example image generation workflow 300 depicts generation of the image file 212 of FIG. 2. In the example of FIG. 3, the offline engine and image generator 202 provides data to a screenshot taker 302, which generates the image data 212 as a screenshot.

In further detail, the offline engine and image generator 202 includes an offline engine 304 and a visualization renderer 306. In some implementations, the offline engine 304 receives the analytical data 210, which includes one or more measures 310, one or more dimensions 312, and one or more filters 314. In some examples, the offline engine 304 retrieves raw data from a data source 316 based on the one or more measures 310, one or more dimensions 312, and one or more filters 314. By way of non-limiting example, an example query for gross margin versus product with three filters applied can be provided as:

"select sum(entityId3) AS 'Gross Margin', entityId0 AS 'Product Name' from data where entityId0 in ('iPhone 7', 'Canon 700D', 'Dairy Milk') group by entityId0"

An example response (raw data) returned for the example query can be provided as:

"[{"columns":["Gross Margin", "Product Name"], "values":[[261504, "Canon 700D"],[160362, "Dairy Milk"], [360228, "iPhone 7"]]}]"

In some examples, the offline engine 304 provides visualization data based on the raw data retrieved from the data source. In some examples, the visualization renderer 306 renders a visualization based on the visualization data. Example visualizations include, without limitation, graphs, charts, tables.

In some examples, the visualization is rendered in a hypertext markup language (HTML) content division element (<div>), which can be described as a generic container for flow content. In some examples, flow content includes text and embedded content. An example <div> can be provided as:

```
<div id="chart" style="position: absolute; top: 0px; z-index: -1;">
  <div>
    <div data-highcharts-chart="3" style="overflow: hidden;">
      <div
        id="highcharts-p312fgg-43"
        dir="ltr"
        class="highcharts-container"
        style="position: relative; overflow: hidden; width: 600px; height: 400px; text-align: left; line-height: normal; z-index: 0; -webkit-tap-highlight-color: rgba(0, 0, 0, 0);"
      <
        <svg>
        </svg>
      </div>
    </div>
  </div>
</div>
```

Listing 1: Example <div>

In some implementations, the screenshot taker 302 receives the visualization from the visualization renderer 306 and generates the image data 212. For example, the screenshot taker 302 receives the <div> from the visualization renderer 306 and generates the image data 212 as a screenshot of the <div>.

For example, the <div> containing the visualization is placed behind a video player by setting its z-index to −1. In this manner, the visualization is not visible. By using a querySelector method of the document object model (DOM), the non-visible <div> can be obtained and passed to a library, which converts the <div> to an image represented in the image data 212. The image data 212 is provided to the LiveVideo creator 204, which generates the video 214 and the metadata 216.

In some implementations, the input to the LiveVideo creator 204 can be the image 218, the image 212, and/or the audio file 220. Using this incoming data, a metadata file is provided, which defines what media the video is made of. A sample metadata file can be provided as

```
{
  "filesCount": 3,
  "metadata": [
    {
      "type": "IMAGE",
      "duration": "2",
      "imgFile":
"/Users/i322916/Documents/Livevideo/Content/Projects/demo/Images/0.png"
    },
    {
      "type": "LIVEFILE",
      "duration": "4",
      "imgFile":
"/Users/i322916/Documents/Livevideo/Content/Projects/demo/LiveFiles/1.png",
      "metaFile":
"/Users/i322916/Documents/Livevideo/Content/Projects/demo/LiveFiles/1.json"
    },
    {
      "type": "AUDIO",
      "duration": 0,
      "audioFile":
"/Users/i322916/Documents/Livevideo/Content/Projects/demo/AudioFiles/4.mp3"
    }
  ]
}
```

Example Metadata

Accordingly, the metadata provides details about the type of artifact, the duration of the content in the video and where the image/audio file is stored in the system. Further, the "LIVEFILE" type, which has the analytical content, also has path to the metafile and contains information required to re-run a query on a designated data source. An example metafile can be provided as:

{
  "dataSource": "Workbook",
  "filters": { },
  "chartType": "column",
  "dimension": "Country",
  "measure": ["Sales Revenue"],
  "duration": "4"
}

Example Metafile

In some implementations, the video is generated using an open source framework (e.g., ffmpeg). The live video converter reads the metadata file it has created and converts it into a format that can be given as input to ffmpeg. The created video is sent to the player so that it can be played and the metadata is stored for future use to recreate the video, as described herein.

Figure 4:
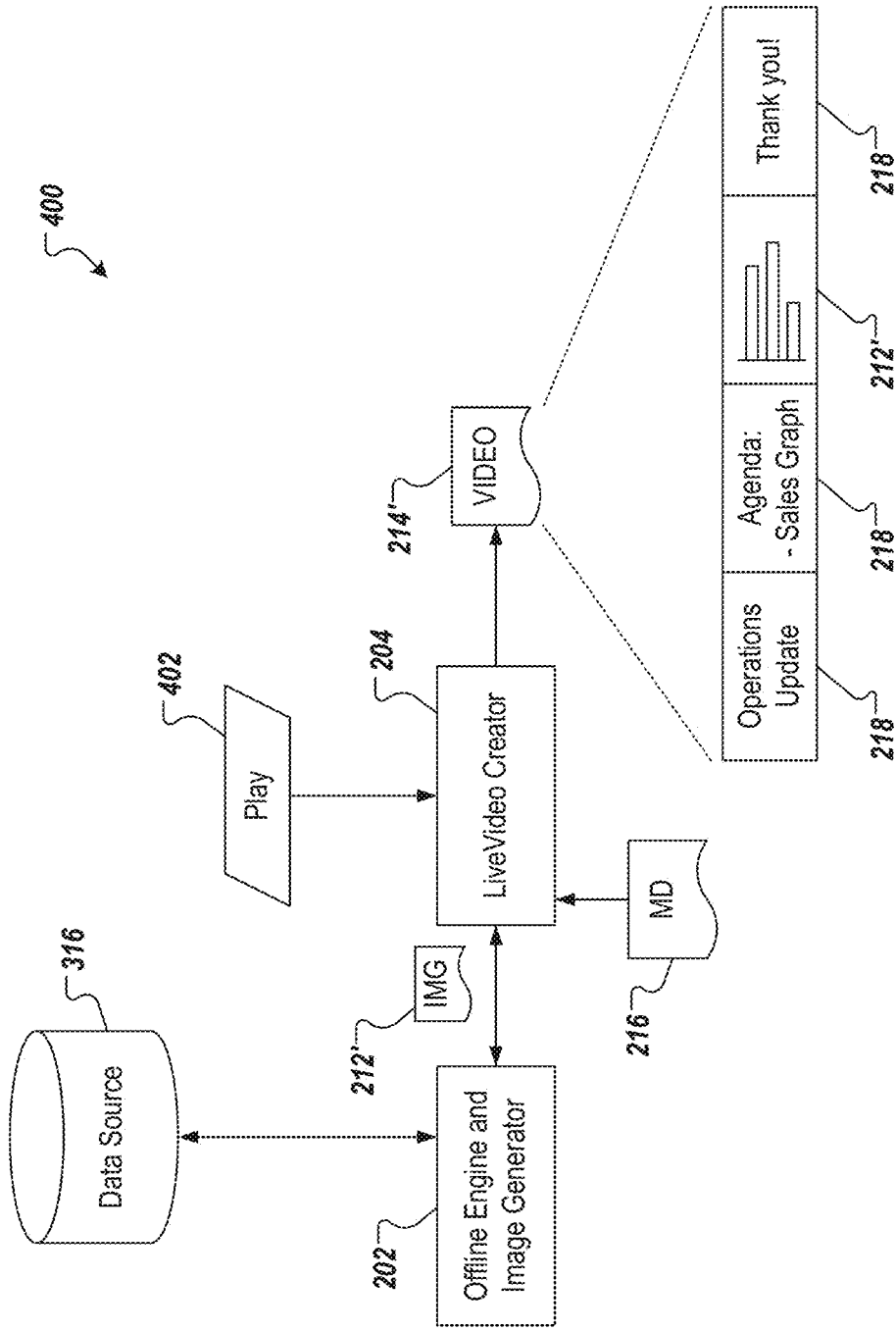
FIG. 4 depicts an example video updating workflow in accordance with implementations of the present disclosure.

FIG. 4 depicts an example video updating workflow 400 in accordance with implementations of the present disclosure. In some implementations, input 402 is provided to the LiveVideo creator 204, the input 402 indicating a request to play the video 214. For example, the input 402 can be provided in response to user selection of a play UI element. As another example, the input 402 can be provided in response to a UI being displayed to a user (e.g., display of a daily feed that includes the video embedded therein).

In some implementations, in response to the input 402, the LiveVideo creator 204 references the metadata 216 to determine whether any data sources are to be queried to provide an updated visualization. If the metadata 216 indicates one or more data sources, the LiveVideo creator 204 requests one or more updated images from the offline engine and image generator 202. In some examples, the LiveVideo creator 204 transmits a request that indicates the data source that is to be queried and the analytical data that is to be used to query the data source (e.g., both provided from the metadata 216). In some examples, in response to the request, the offline engine and image generator 202 generates an image 212' that depicts a visualization. In some examples, the image 212' is generated in the same manner as described above with respect to the image 212 and reference to FIG. 3, beginning with the offline engine 304 receiving the data from the data source 316. In some implementations, the LiveVideo creator 204 receives the image 212' and generates the video 214' in the same manner as described above with respect to the video 214.

In some implementations, before generating the video 214', it can be determined whether the data underlying the image 212 has changed within the data source 316, since the image 212 was generated. In some examples, if the data has not changed, generating of the video 214' can be foregone and the video 214 (the originally created video) can be played in response to the input 402. That is, because the data is unchanged, the visualization depicted in the image 212 is unchanged and there is no need to regenerate the image 212 as the image 212'. In this manner, time and computing resources can be conserved. In some examples, an indicator can be provided, which indicates when the data was last changed. For example, in response to a change in the data, an indicator can be provided to the offline engine and image generator 202 and/or the LiveVideo creator 204 (e.g., from the data source). In some examples, the data retrieved in response to the request from the LiveVideo creator 204 can be compared to the data originally retrieved in generating the image 212 to determined whether the data has changed since the image 212 was generated.

Figure 5:
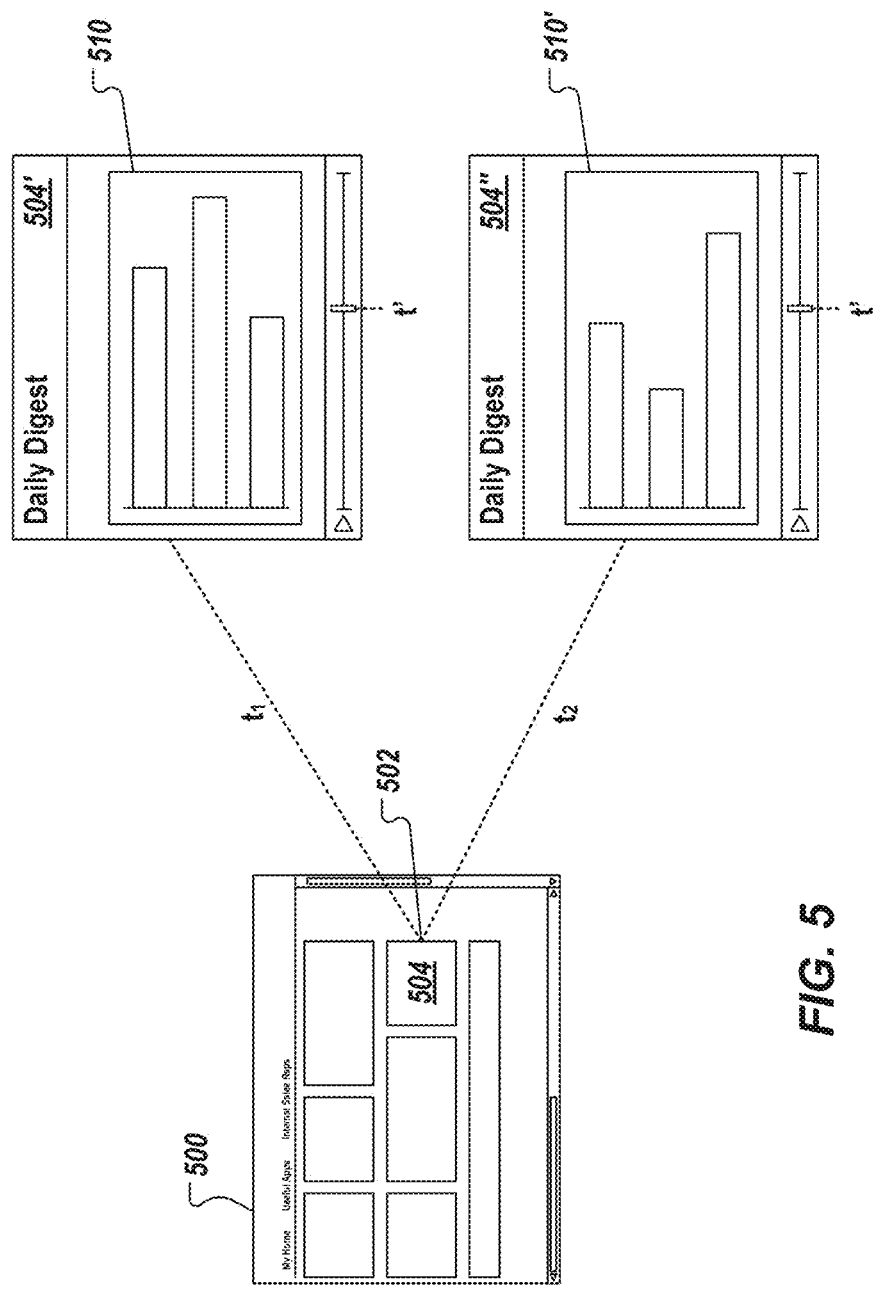
FIG. 5 depicts an example use case in accordance with implementations of the present disclosure.

FIG. 5 depicts an example use case in accordance with implementations of the present disclosure. The example use case includes a UI 500 that is displayed to a user on a computing device. For example, the UI 500 can include a web page that is displayed to the user within a web browser executed on a computing device (e.g., a web browser executed on the client device 102 of FIG. 1). In the examples of FIG. 5, the UI 500 includes a UI element 502, within which a video 504 is embedded and can be played to the user. In some examples, the video 504 automatically plays in response to opening of the UI 500. In some examples, the video 504 is played in response to the user selecting a control element (e.g., clicking on a play button).

In accordance with implementations of the present disclosure, the video 504 can be played at a first time $t_1$ as a video 504' and can be played at a second time t2 as a video 504". By way of non-limiting example, the first time $t_1$ can be a day and the second time t2 can be a subsequent day. In the depicted example, the video 504' includes content 510 that is displayed beginning at a time t' within the video 504'. In the depicted non-limiting example, the content 510 includes a bar graph (e.g., representing revenue by city). In some implementations, at the second time t2, the video 504 is updated to include updated content that is to be presented within the video 504".

Figure 6:
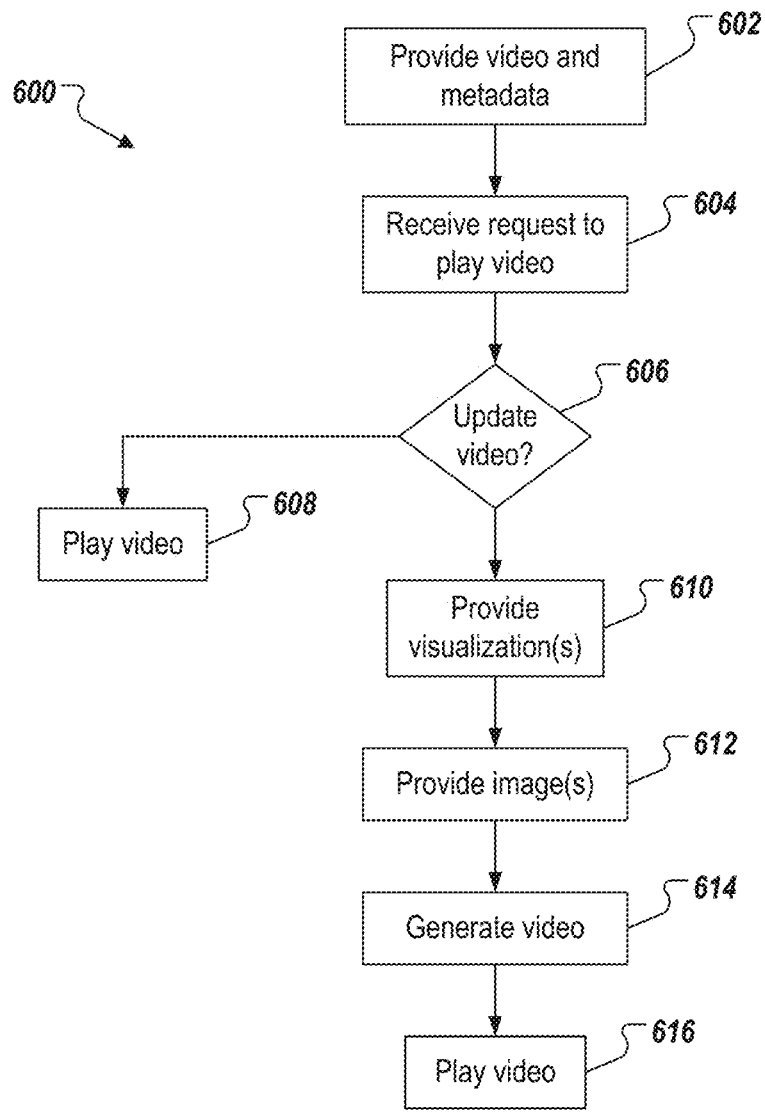
FIG. 6 depicts an example process that can be executed in accordance with implementations of the present disclosure.

FIG. 6 depicts an example process 600 that can be executed in accordance with implementations of the present disclosure. In some examples, the example process 600 is provided using one or more computer-executable programs executed by one or more computing devices.

A video and metadata are provided (602). For example, and as described herein (e.g., with reference to FIG. 2), the video 214 and the metadata 216 are provided. In some examples, the LiveVideo creator 204 receives media (e.g., one or more images 218, one or more images 212, audio 220). In some examples, the metadata 216 provides information for generation of the video 214. In some examples, the metadata 216 indicates the data source, from which data is to be retrieved. In some examples, the metadata 216 indicates media, order of media, and duration of each medium provided in the video 214. In some examples, the metadata 216 indicates analytical data that is used to query each of the one or more data sources indicated in the metadata 216.

A request to play the video is received (604). For example, and as described herein with reference to FIG. 4, the input 402 can be provided in response to user selection of a play UI element. As another example, the input 402 can be provided in response to a UI being displayed to a user (e.g., display of the UI 500 as a web page within a web browser executed on a computing device). It is determined whether the video is to be updated (606). For example, and as described herein, it can be determined whether the metadata 216 indicates that one or more data sources are to be queried for data to provide one or more visualizations depicted within the video. As another example, and as described herein, it can be determined whether data within the one or more data sources has changed. If it is determined that the video is not to be updated, the video is played (608). For example, the video 214 is played within a video player (e.g., embedded in a web page).

If it is determined that the video is to be updated, one or more visualizations are provided (610). For example, and as described herein with reference to FIG. 3, the offline engine 304 retrieves raw data from a data source 316 based on the one or more measures, one or more dimensions, and one or more filters (e.g., provided in the metadata 216), and the visualization renderer 306 renders a visualization (e.g., as a <div>) based on the visualization data. One or more images are generated (612). For example, and as described herein, the screenshot taker 302 receives the <div> from the visualization renderer 306 and generates the image data 212' as a screenshot of the <div>. A video is generated (614). For example, and as described herein with reference to FIG. 4, the LiveVideo creator 204 generates the video 214' based on the image data 212'. The video is played (616). For example, the video 214 is played within a video player (e.g., embedded in a web page).

Figure 7:
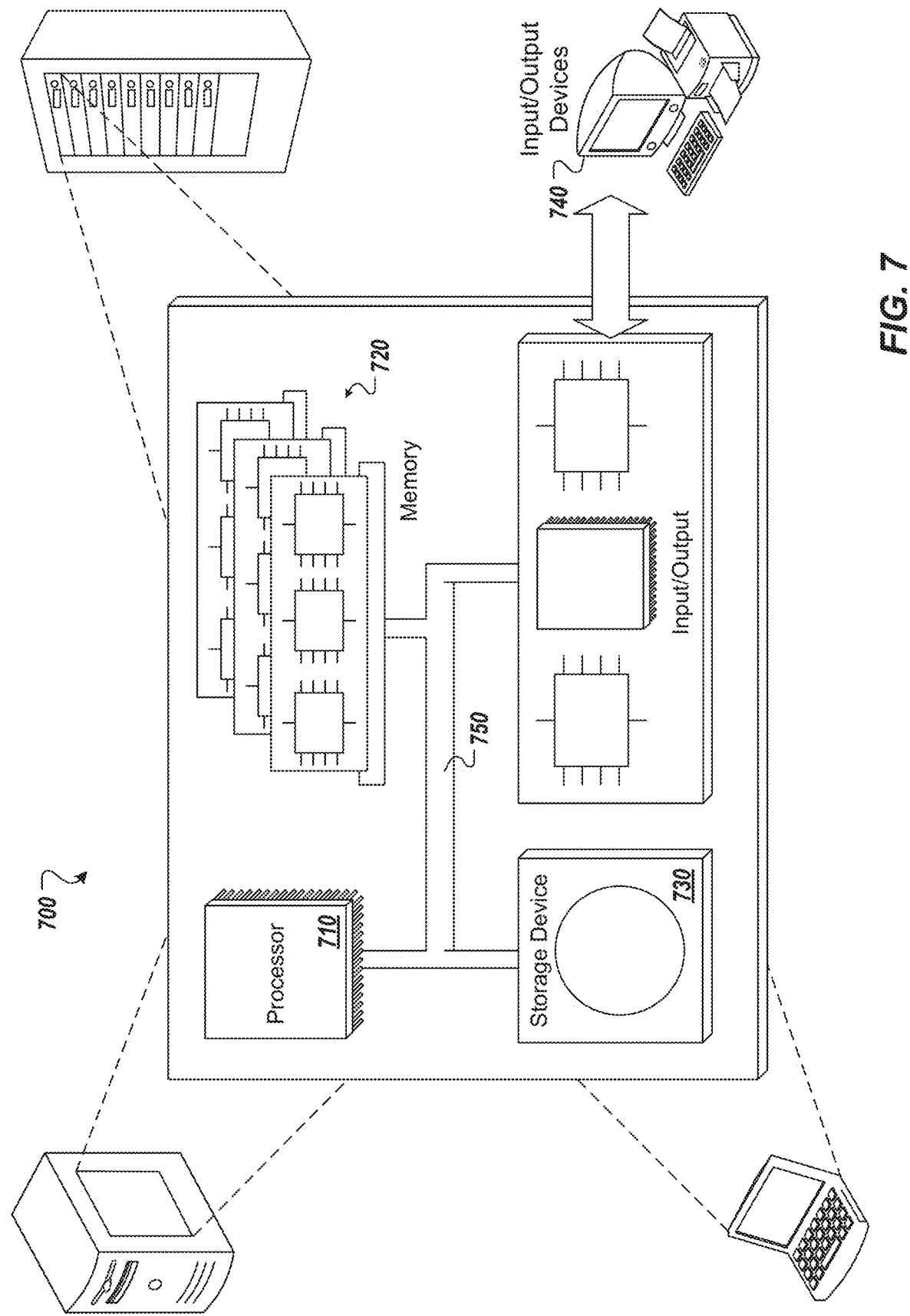
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In some implementations, the memory 720 is a non-volatile memory unit. The storage device 730 is capable of providing mass storage for the system 700. In some implementations, the storage device 730 is a computer-readable medium. In some implementations, the storage device 730 may be a floppy disk device, a hard disk device, an optical disk device, or a tape device. The input/output device 740 provides input/output operations for the system 700. In some implementations, the input/output device 740 includes a keyboard and/or pointing device. In some implementations, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing dynamic content in videos between plays of the videos, the method being executed by one or more processors and comprising:
   receiving metadata indicating one or more data sources and analytical data used to query the one or more data sources;
   in response to a request to play a video, automatically retrieving data from a data source indicated in the metadata based on the analytical data;
   generating a visualization based on a change of the data, the visualization comprising an updated version of a previous visualization, the visualization comprising a graph, a chart or a table;
   generating an image of the visualization; and
   providing the video comprising the image, the image replacing a previous image within the video.

2. The method of claim 1, wherein the video is generated based on a set of images comprising one or more static images and one or more dynamic images, the image comprising a dynamic image.

3. The method of claim 1, wherein the visualization is generated as a hypertext markup language (HTML) content division element (<div>).

4. The method of claim 1, wherein the image is generated as a screenshot of the visualization.

5. The method of claim 1, wherein the analytical data comprises at least one measure and at least one dimension.

6. The method of claim 1, wherein the data source comprises one of a database and a data file.

7. The method of claim 1, wherein retrieving the data comprises querying the data source using a query and receiving the data responsive to the query.

8. A non-transitory computer-readable storage medium coupled to one or more processors and having instructions stored thereon which, when executed by the one or more processors, cause the one or more processors to perform operations for providing dynamic content in videos between plays of the videos, the operations comprising:
   receiving metadata indicating one or more data sources and analytical data used to query the one or more data sources;
   in response to a request to play a video, automatically retrieving data from a data source indicated in the metadata based on the analytical data;
   generating a visualization based on a change of the data, the visualization comprising an updated version of a previous visualization;
   generating an image of the visualization, the visualization comprising a graph, a chart or a table; and
   providing the video comprising the image, the image replacing a previous image within the video.

9. The computer-readable storage medium of claim 8, wherein the video is generated based on a set of images comprising one or more static images and one or more dynamic images, the image comprising a dynamic image.

10. The computer-readable storage medium of claim 8, wherein the visualization is generated as a hypertext markup language (HTML) content division element (<div>).

11. The computer-readable storage medium of claim 8, wherein the image is generated as a screenshot of the visualization.

12. The computer-readable storage medium of claim 8, wherein the analytical data comprises at least one measure and at least one dimension.

13. The computer-readable storage medium of claim 8, wherein the data source comprises one of a database and a data file.

14. The computer-readable storage medium of claim 8, wherein retrieving the data comprises querying the data source using a query and receiving the data responsive to the query.

15. A system, comprising:
   a computing device; and
   a computer-readable storage device coupled to the computing device and having instructions stored thereon which, when executed by the computing device, cause the computing device to perform operations for natural language explanations for providing dynamic content in videos between plays of the videos, the operations comprising:
      receiving metadata indicating one or more data sources and analytical data used to query the one or more data sources;
      in response to a request to play a video, automatically retrieving data from a data source indicated in the metadata based on the analytical data;
      generating a visualization based on a change of the data, the visualization comprising an updated version of a previous visualization, the visualization comprising a graph, a chart or a table;
      generating an image of the visualization; and
      providing the video comprising the image, the image replacing a previous image within the video.

16. The system of claim 15, wherein the video is generated based on a set of images comprising one or more static images and one or more dynamic images, the image comprising a dynamic image.

17. The system of claim 15, wherein the visualization is generated as a hypertext markup language (HTML) content division element (<div>).

18. The system of claim 15, wherein the image is generated as a screenshot of the visualization.

19. The system of claim 15, wherein the analytical data comprises at least one measure and at least one dimension.

20. The system of claim 15, wherein the data source comprises one of a database and a data file.

* * * * *